US008607064B2

(12) United States Patent
Uneda et al.

(10) Patent No.: US 8,607,064 B2
(45) Date of Patent: Dec. 10, 2013

(54) BIOMETRIC AUTHENTICATION DEVICE AND BIOMETRIC AUTHENTICATION METHOD

(75) Inventors: Masatsugu Uneda, Owariasahi (JP); Tsukasa Yasue, Nagakute (JP); Atsuhiro Imaizumi, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 195 days.

(21) Appl. No.: 13/161,123

(22) Filed: Jun. 15, 2011

(65) Prior Publication Data
US 2012/0011586 A1 Jan. 12, 2012

(30) Foreign Application Priority Data

Jul. 6, 2010 (JP) ................. 2010-153524

(51) Int. Cl.
*G06F 21/00* (2013.01)
(52) U.S. Cl.
USPC ........... 713/186; 713/182; 713/183; 713/184; 713/185; 726/17; 726/18; 726/19; 726/20; 726/21
(58) Field of Classification Search
USPC ............................... 713/182–186; 726/17–21
See application file for complete search history.

(56) References Cited

U.S. PATENT DOCUMENTS

2006/0115129 A1 6/2006 Abe
2006/0130138 A1* 6/2006 Chigira et al. ............. 726/17
2008/0212846 A1 9/2008 Yamamoto et al.
2008/0240515 A1 10/2008 Uno et al.
2009/0150320 A1* 6/2009 Geppert ..................... 706/47
2010/0275258 A1* 10/2010 Kamakura ................. 726/19

FOREIGN PATENT DOCUMENTS

| CN | 101006466 A | 7/2007 |
| CN | 101277190 A | 10/2008 |
| JP | 2000-215313 | 8/2000 |
| JP | 2008-171094 A | 7/2008 |
| KR | 10-2008-0088416 A | 10/2008 |

* cited by examiner

*Primary Examiner* — Edan Orgad
*Assistant Examiner* — Roderick Tolentino
(74) *Attorney, Agent, or Firm* — Foley & Lardner LLP

(57) ABSTRACT

A biometric authentication device performs authentication of a user based on biometric information. In the biometric authentication device, a registry information storage stores pre-registered biometric information as registry information. An acceptance value determiner determines a verification acceptance value used for authentication, based on quality of the registry information with regard to reliability of characterizing an individual. An authentication information acquirer obtains biometric information of a user as authentication information. A similarity calculator compares the authentication information of the user with the registry information and calculates similarity between the authentication information and the registry information. An authenticator identifies whether the user is a registrant corresponding to the registry information, based on the similarity and the verification acceptance value.

7 Claims, 9 Drawing Sheets

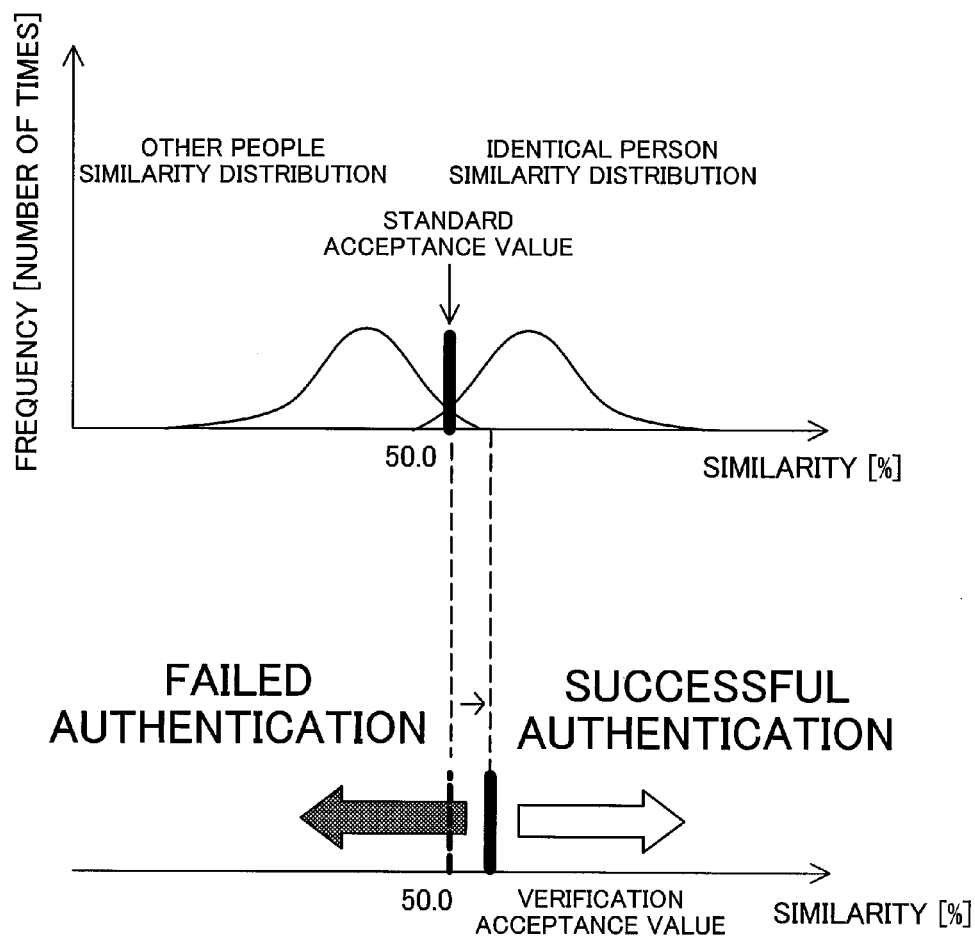

BIOMETRIC AUTHENTICATION DEVICE AND BIOMETRIC AUTHENTICATION METHOD

CROSS-REFERENCE TO RELATED APPLICATION

The present application claims priority from Japanese application P2010-153524A filed on Jul. 6, 2010, the content of which is hereby incorporated by reference into this application.

BACKGROUND

1. Field of the Invention

The present invention relates to biometric authentication.

2. Description of the Related Art

Biometric information-based authentication has been known as an individual identification technique. In 1:N authentication of biometric identification, there are possibilities of wrong rejection of an identical person and wrong authentication of other people (hereafter wrong rejection of the identical person and wrong authentication of other people are collectively referred to as "wrong identification"). The biometric information used for biometric authentication varies among different individuals. For example, the biometric information of some individuals may have a small amount of characteristic features or very simple characteristic features. Such biometric information may have significant contributions to wrong identification. One proposed method to reduce the potential risk of wrong identification compares the biometric information with registered data for matching and calculates an identification reference value according to the matching distribution (see, for example, JP 2000-215313).

This proposed method requires recalculation of the matching distribution in the case of an increase in number of registered data or in the case of transfer of registered data to another database. A change of the population of registered data may significantly change the user's convenience, for example, changing the identification reference value and the identification result or varying the processing time for individual identification.

SUMMARY

By taking into account at least part of the issue discussed above, there is a requirement for reducing the potential risk of wrong identification without significantly changing the user's convenience by the population of registered data. In order to address at least part of the requirement described above, the present invention provides various embodiments and applications described below.

One aspect of the present invention is directed to a biometric authentication device of performing authentication of a user based on biometric information. The biometric authentication device includes: a registry information storage configured to store pre-registered biometric information as registry information; an acceptance value determiner configured to determine a verification acceptance value used for authentication, based on quality of the registry information with regard to reliability of characterizing an individual; an authentication information acquirer configured to obtain biometric information of a user as authentication information; a similarity calculator configured to compare the authentication information of the user with the registry information and calculate similarity between the authentication information and the registry information; and an authenticator configured to identify whether the user is a registrant corresponding to the registry information, based on the similarity and the verification acceptance value.

The biometric authentication device according to this aspect of the invention determines the verification acceptance value based on the quality of the registry information and uses the determined verification acceptance value for authentication. In the state where the registry information storage stores registry information of a plurality of registrants, the biometric authentication device does not perform authentication based on the verification acceptance value in correlation to each of the registry information determined by relative evaluation to the other registry information. Even when there is a change in number of registry information stored in the registry information storage or a change in quality of each of the registry information, for example, on the occasion of data integration with registry information stored in another biometric authentication device or on the occasion of a system transfer, this arrangement assures stable authentication without significantly changing the user's convenience.

According to one preferable embodiment of the biometric authentication device, the acceptance value determiner determines the verification acceptance value by changing a standard acceptance value set in advance as a criterion for authentication according to the quality.

In the biometric authentication device of this embodiment, the acceptance value determiner determines the verification acceptance value, based on the standard acceptance value. The standard acceptance value is set in advance according to diversity of factors (for example, security level of a system adopting this biometric authentication device). Such setting enables an increase or a decrease in verification acceptance value for all the registry information stored in the registry information storage.

According to another preferable embodiment of the biometric authentication device, the acceptance value determiner determines the verification acceptance value in an authentication process.

The biometric authentication device of this embodiment determines the verification acceptance value in the authentication process. This arrangement enables the standard acceptance value used for determining the verification acceptance value or any other factor used for determining the verification acceptance value to be flexibly changed, before authentication. In another application, the verification acceptance value may be determined before authentication, for example, at the time of storing the registry information. In this application, the verification acceptance value should be determined again every time there is any change in standard acceptance value or any other factor. This application can not flexibly respond to a change in environment (for example, a change in security level) where the biometric authentication device is installed.

According to still another preferable embodiment of the biometric authentication device, the registry information storage stores biometric information of a plurality of the registrants as registry information. The acceptance value determiner determines a verification acceptance value in correlation to each of the registry information corresponding to each of the plurality of the registrants, based on quality of the each of the registry information. The similarity calculator compares the authentication information of the user with each of the registry information and calculates similarity between the authentication information and the each of the registry information. The authenticator identifies whether the user is one of the plurality of the registrants, based on the verification acceptance value and the similarity in correlation to each of the registry information.

The biometric authentication device of this embodiment enables 1:N authentication and does not significantly change the user's convenience with an increase or a decrease in number of registrants.

According to another preferable embodiment, the biometric authentication device further includes a registry information acquirer configured to obtain the biometric information as the registry information and store the obtained biometric information into the registry information storage.

The biometric authentication device of this embodiment has the registration function of the registry information, in addition to the authentication function.

According to another preferable embodiment of the biometric authentication device, the acceptance value determiner determines the verification acceptance value to increase probability of successful authentication of the user as the registrant corresponding to the registry information by the authenticator, with an increase in quality of the registry information.

The higher quality of registry information reduces the potential risk of wrong authentication of other people. In order to further lower the probability of wrong rejection of the identical person, the biometric authentication device of this embodiment determines the verification acceptance value to increase the probability of successful authentication of the user as the registrant corresponding to the registry information by the authenticator, with an increase in quality of the registry information. This arrangement lowers the probability of wrong rejection of the identical person, while reducing the potential risk of wrong authentication of other people.

According to another preferable embodiment of the biometric authentication device, the acceptance value determiner determines the verification acceptance value by changing the standard acceptance value according to a product of the quality and a preset value.

The biometric authentication device of this embodiment is capable of changing the verification acceptance value by a factor other than the standard acceptance value.

According to another preferable embodiment of the biometric authentication device, the preset value is based on a security level for authentication.

The biometric authentication device of this embodiment is capable of determining the verification acceptance value according to the security level.

According to another preferable embodiment of the biometric authentication device, the biometric information is information of finger vein.

The biometric authentication device of this embodiment is capable of adopting finger veins as the biometric information.

Another aspect of the present invention is directed to a biometric authentication method of performing authentication of a user based on biometric information. The biometric authentication method stores pre-registered biometric information as registry information, determines a verification acceptance value used for authentication, based on quality of the registry information with regard to reliability of characterizing an individual, and obtains biometric information of a user as authentication information. The biometric authentication method compares the authentication information of the user with the registry information and calculates similarity between the authentication information and the registry information. The biometric authentication method then identifies whether the user is a registrant corresponding to the registry information, based on the similarity and the verification acceptance value.

The biometric authentication method according to this aspect of the invention determines the verification acceptance value based on the quality of the registry information and uses the determined verification acceptance value for authentication. In an application of storage of registry information of a plurality of registrants, the biometric authentication method does not perform authentication based on the verification acceptance value in correlation to each of the registry information determined by relative evaluation to the other registry information. This arrangement assures stable authentication even in the case of a change in number of stored registry information or a change in quality of each of the registry information.

The present invention may be actualized by diversity of other applications in addition to the biometric authentication device and the biometric authentication method discussed above, for example, an individual authentication method, an individual authentication device, an individual authentication system, integrated circuits and computer programs configured to actualize the functions of the devices and the methods, and recording media in which such computer programs are recorded.

BRIEF DESCRIPTION OF THE DRAWINGS

FIG. 9 is an explanatory diagram of the advantageous effect of the invention.

DESCRIPTION OF THE PREFERRED EMBODIMENTS

Various embodiments of the present invention will now be described with reference to the accompanying drawings.

A. First Embodiment (A1) System Configuration

Figure 1:
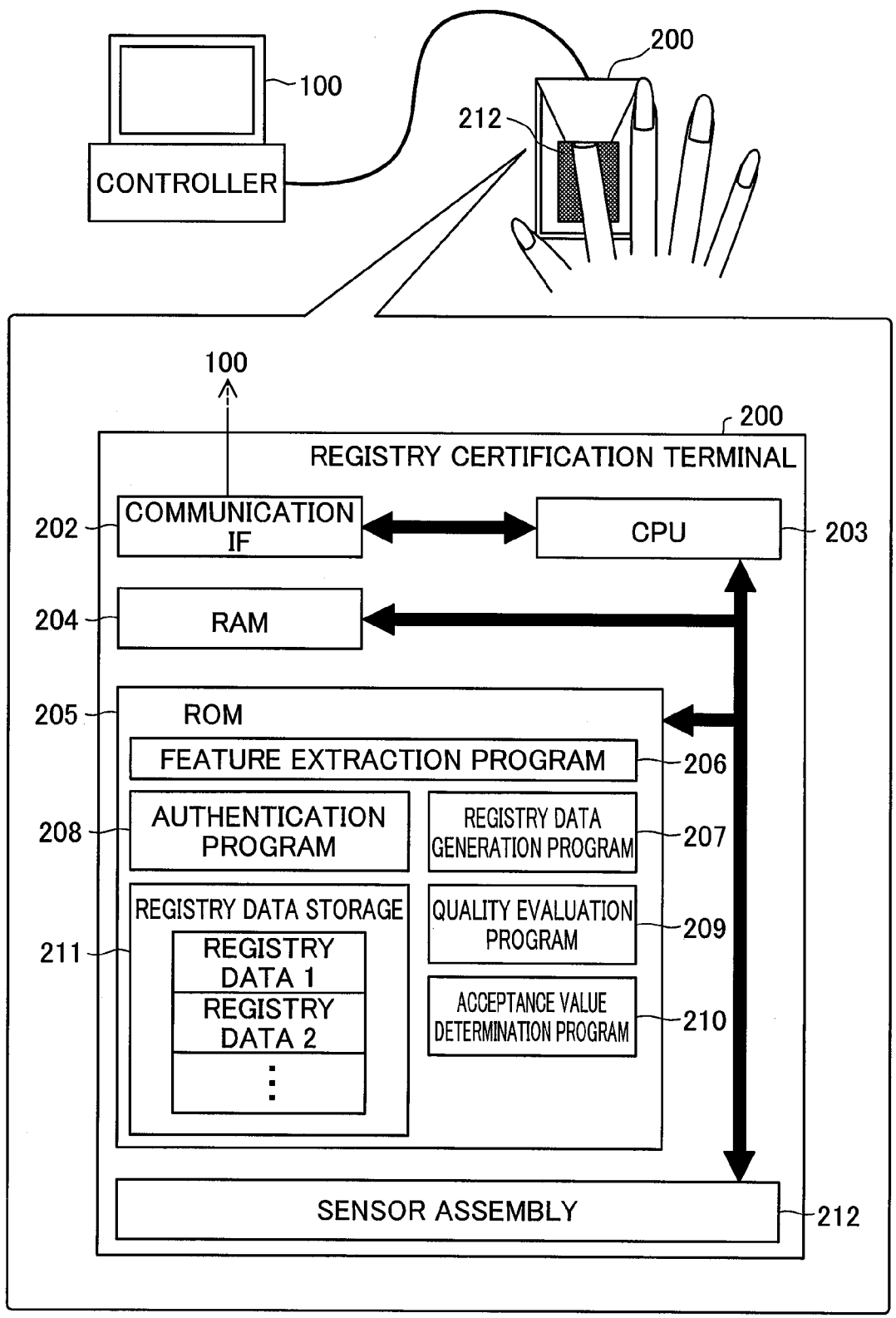
FIG. 1 is an explanatory diagram of the configuration of a biometric authentication system according to one embodiment of the present invention.

FIG. 1 shows the configuration of a biometric authentication system 10 according to one embodiment of the present invention. The biometric authentication system 10 includes a computer 100 and a registry certification terminal 200, which are interconnected via a USB cable 300. Each of the users of the computer 100 (hereafter referred to as "the user") has registered in advance the user's individual biometric information into the biometric authentication system 10. At each login time to the computer 100, the user is required to reenter the individual biometric information via the registry certification terminal 200. The registry certification terminal 200 performs authentication to identify whether a person who demands to log in to the computer 100 (hereafter referred to as "login demander") is an authorized user of the computer 100 (hereafter this process is referred to as "authentication"). When the login demander is identified as an authorized user, the registry certification terminal 200 gives permission for the login demander to log in to the computer 100. The biometric authentication system 10 performs 1:N authentication to identify whether the login demander to the computer 100 is one of a plurality of authorized users.

The computer 100 is a general-purpose computer including a CPU, a RAM, a ROM, and a hard disk and is thus not specifically described here. The registry certification terminal 200 scans the biometric characteristics of the user and performs authentication based on the scanned biometric characteristics. In this embodiment, the registry certification terminal 200 performs authentication, based on the user's finger veins used as the biometric information. Any other suitable pieces of information relating to the physical characteristics or the behavioral characteristics of each individual, for example, fingerprint, iris, face, signature, or voiceprint may be used for authentication. Any of these pieces of information representing the biometric characteristics of each individual is included in the "biometric information".

The registry certification terminal 200 includes a communication interface 202 (hereafter referred to as "communication IF 202"), a CPU 203, a RAM 20, a ROM 20, and a sensor assembly 212. The communication IF 202 serves as an interface for communication with the computer 100. The CPU 203 controls the general operations of the registry certification terminal 200, performs various arithmetic operations, and makes communication with the computer 100 via the communication IF 202. The RAM 204 is a rewritable volatile memory. The CPU 203 loads and executes various programs, which are stored in the ROM 205, on the RAM 204. The various programs stored in the ROM 205 include a feature extraction program 206, a registry data generation program 207, an authentication program 208, a quality evaluation program 209, and an acceptance value determination program 210. The ROM 205 has a registry data storage 211 for storing registry data generated in a registration process (discussed later). In this embodiment, the ROM 205 is a flash memory as a rewritable non-volatile memory. The sensor assembly 212 uses infrared rays to read information on the veins of the user's finger held on or above the sensor assembly 212 (hereafter referred to as "vein information"). The sensor assembly 212 starts reading the user's vein information in response to an external trigger, for example, a reading instruction through the login demander's operations of the computer 100 or a change in reflection or absorption of infrared rays caused by the login demander's finger on or over the sensor assembly 212 and detected by the sensor assembly 212. The sensor assembly 212 may be a direct contact type that requires direct contact of the user's finger with part of the sensor assembly 212 or an indirect contact type that does not require direct contact but requires only the user's finger to be held over the sensor assembly 212.

The various programs stored in the ROM 205 are described in detail. The feature extraction program 206 analyzes the vein information read by the sensor assembly 212 and extracts characteristic features usable for individual identification to generate characteristic data. The usable characteristic features may be individually-different features of the veins, for example, the running directions and the sizes of veins and the positions, the angles, and the number of bifurcation points of the veins. At least part of the characteristic features is extracted to be used as the characteristic data. The registry data generation program 207 converts the characteristic data of the vein information extracted by the feature extraction program 206 into a format suitable for storage in the registry data storage 211. This registry data generation program 207 is performed in the registration process of the user's vein information. The authentication program 208 is performed in an authentication process (discussed later) and calculates the similarity of characteristic features extracted from the vein information read by the sensor assembly 212 in the authentication process with the registry data registered in advance. As mentioned above, extraction of the characteristic features from the vein information read by the sensor assembly 212 is performed by the feature extraction program 206. The quality evaluation program 209 evaluates the quality of the characteristic data of the vein information extracted by the feature extraction program 206 to calculate a quality value, and correlates the calculated quality value to the registry data. The acceptance value determination program 210 determines a verification acceptance value used in the authentication process, based on the quality value correlated to the registry data by the quality evaluation program 209.

(A2) Registration Process

Figure 2:
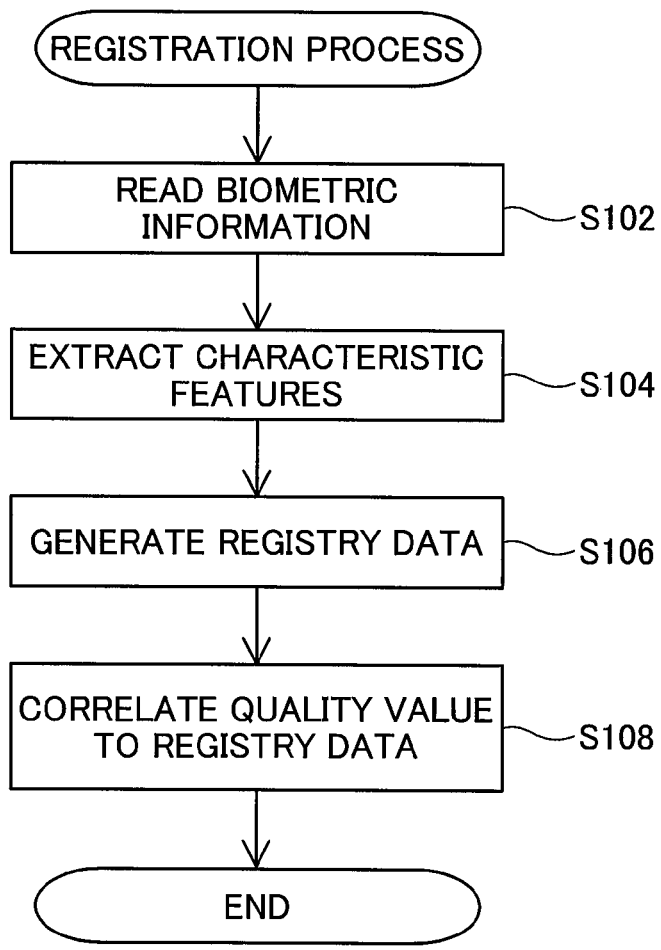
FIG. 2 is an explanatory diagram of a typical flow of registration process.
Figure 3:
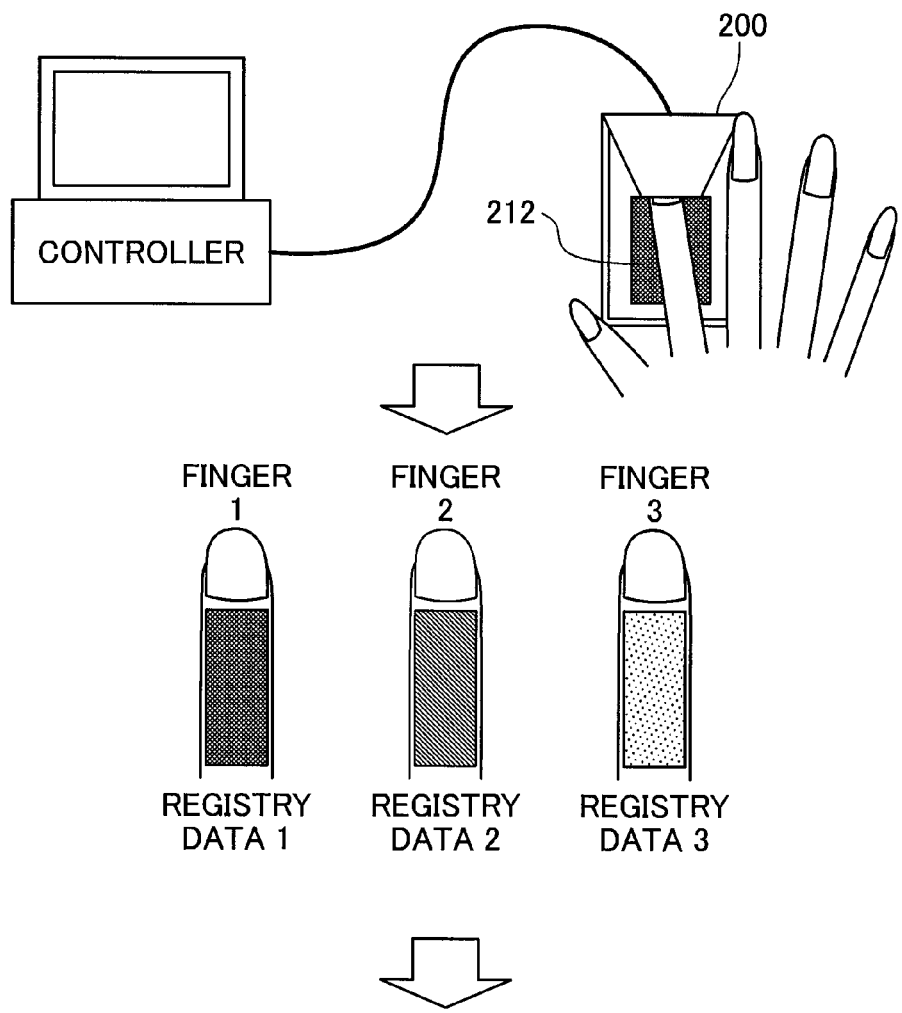
FIG. 3 is an explanatory diagram of the details of the registration process.

The registration process performed by the registry certification terminal 200 for registration of the user's individual biometric information (more specifically, the vein information in this embodiment) into the registry certification terminal 200 is described with reference to FIGS. 2 and 3. FIG. 2 is a flowchart of the registration process performed by the CPU 203. FIG. 3 shows the details of the registration process. The registration process is triggered by the user's registration instruction given to the registry certification terminal 200 through the operations of the computer 100 (FIG. 2). On the start of the registration process, when the user holds a registered finger on or above the sensor assembly 212 (FIG. 3), the CPU 203 controls the sensor assembly 212 to use infrared rays and read the vein information from the user's finger veins (step S102). The CPU 203 then activates the feature extraction program 206 to extract characteristic features usable for individual identification from the vein information and generates characteristic data (step S104). The CPU 203 subsequently converts the characteristic data extracted from the vein information into the format suitable for storage in the registry data storage 211 and stores the converted characteristic data as registry data into the registry data storage 211 (step S106). After generation of the registry data, the CPU 203 analyzes the extracted characteristic data, calculates a quality value representing the quality of the characteristic data evaluated from the uniqueness of the characteristic features and the amount of the characteristic features by taking into account the low probability of coincidental match of the user's characteristic data with characteristic data of anyone else, and stores the quality value correlated to the registry data as additional information of the registry data into the registry data storage 211 (step S108). On storage of the quality value in correlation to the registry data, the CPU 203 terminates the registration process. The quality value will be described in detail below.

(A3) Quality Value

For the simplicity of explanation, in this embodiment, the quality value is assumed to be calculated from only the amount of the characteristic features (hereafter referred to as "characteristic amount") extracted from the vein information. As explained above, the quality value may be calculated from the uniqueness of the characteristic features or another physical quantity (e.g., temperature), in addition to or in place of the characteristic amount. The quality value is calculated from a table of correlating the characteristic amount to the quality value (hereafter referred to as "quality value table").

Figure 4:
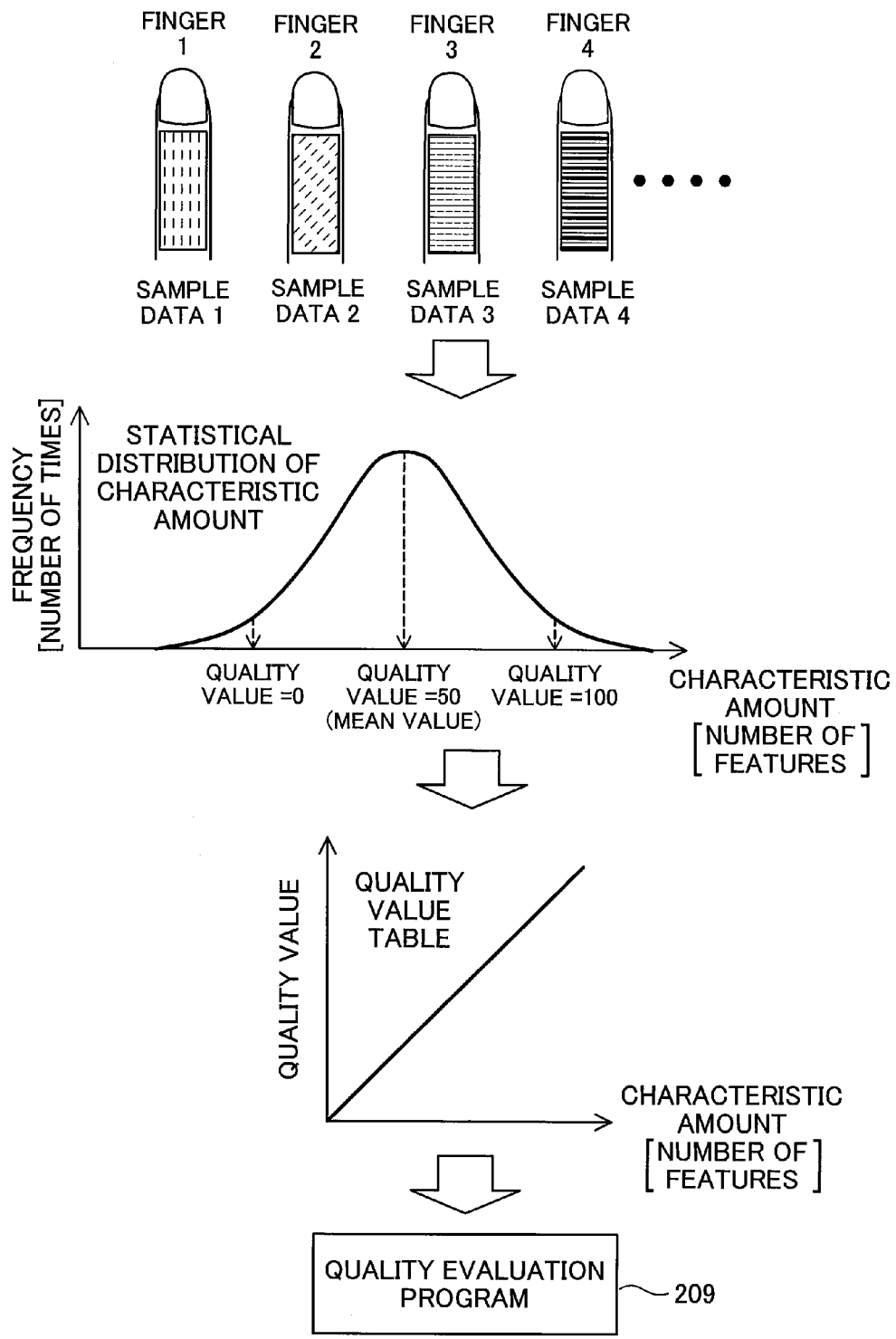
FIG. 4 is an explanatory diagram of a quality value table.

FIG. 4 shows the procedure of creating the quality value table. The quality value table is created from a statistical distribution of characteristic amount showing a variation in characteristic amount against the frequency of its appearance (i.e., the number of samples having each characteristic amount) with respect to a plurality of arbitrarily selected finger vein samples. The statistical distribution of characteristic amount is created by collecting a plurality of arbitrarily selected data for evaluation (samples of finger veins). The number of collected samples should be sufficient for the statistical analysis. A normal distribution is created from a histogram of the characteristic amounts of the collected samples of finger veins. A mean value of the normal distribution, i.e., a characteristic amount at a peak value of the "frequency" in the normal distribution is set to a quality value=50. For the validity of the quality value, +3σ (σ represents the standard deviation) of the normal distribution is set to a quality value=100 and −3σ of the normal distribution is set to a quality value=0. Such settings statistically make approximately 99.7% of the quality values fall in a quality value range of 1 to 99. The remaining quality values are set to have equal data intervals. The quality value table is created by correlating the quality value to the characteristic amount in this manner. The normal distribution shown in FIG. 4 is used only for creation of the quality value table. The quality value table of correlating the quality value to the characteristic amount is used in the registration process.

(A4) Authentication Process

Figure 5:
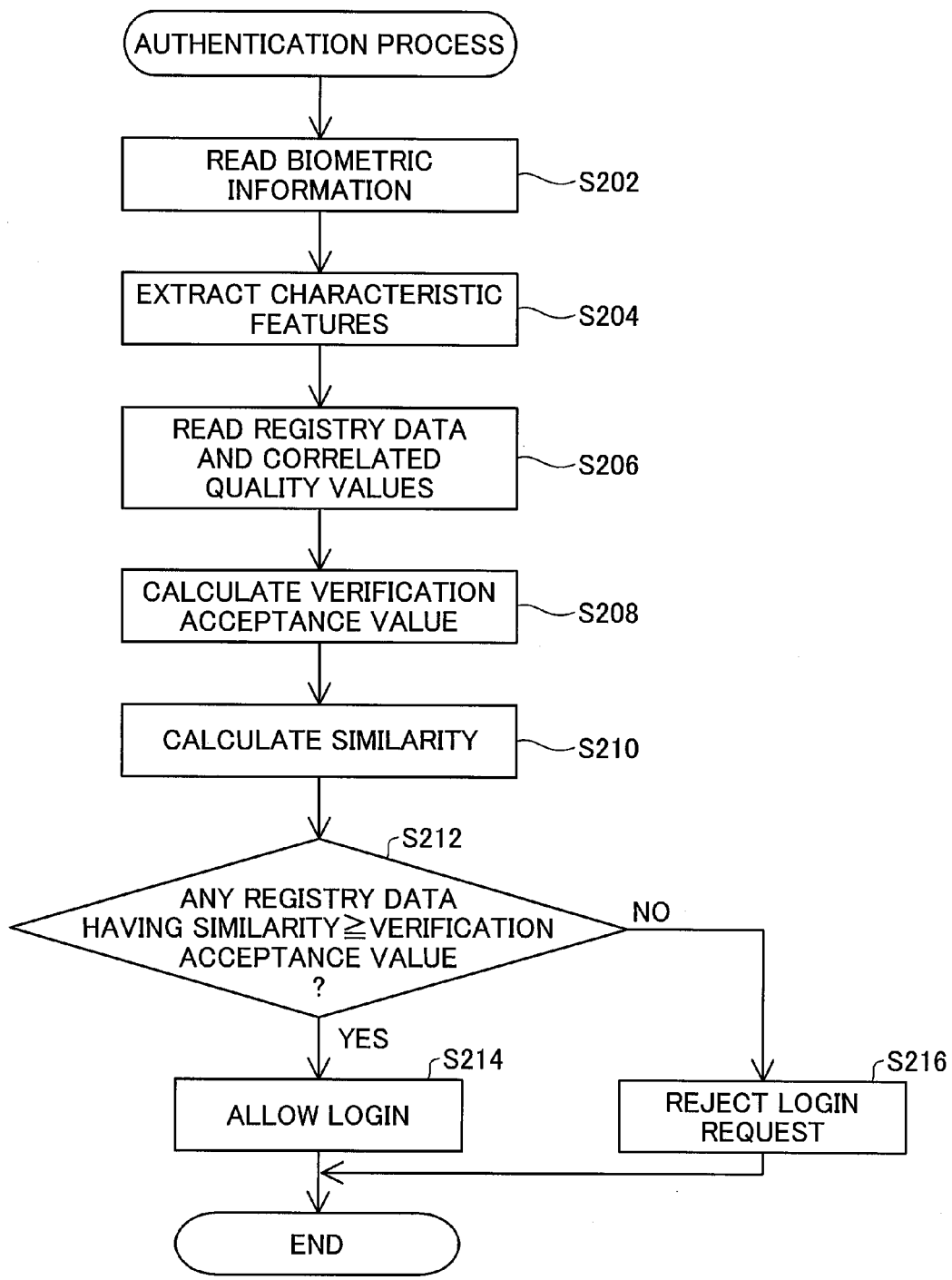
FIG. 5 is an explanatory diagram of a typical flow of authentication process.

The authentication process performed by the CPU 203 to accept or reject a login request of the user to the computer 100 is described with reference to FIGS. 5 and 6. In the description below, the user subject to authentication for a login is referred to as "login demander". FIG. 5 is a flowchart of the authentication process. The CPU 203 starts the authentication process, in response to a login request of the login demander through the operations of the computer 100. On the start of the authentication process, the CPU 203 controls the sensor assembly 212 to use infrared rays and read the vein information from the finger veins of the login demander (step S202). The CPU 203 then activates the feature extraction program 206 to extract characteristic features from the vein information for authentication of the login demander (step S204).

Figure 6A:
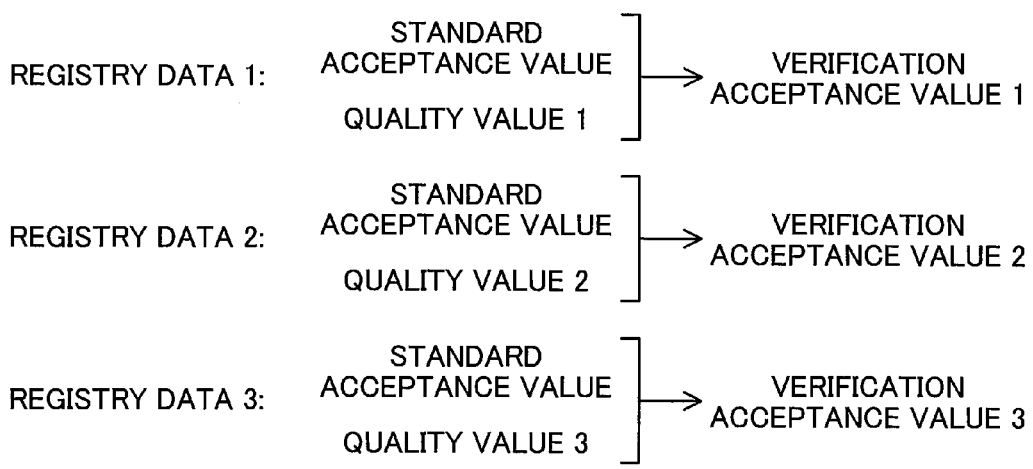
FIG. 6A-6C are explanatory diagrams of the details of the authentication process.

After extraction of the characteristic features from the vein information of the login demander, the CPU 203 reads all the registry data and the correlated quality values from the registry data storage 211 (step S206) and calculates verification acceptance values from the quality values and a standard acceptance value (explained later) with regard to all the registry data (step S208). The quality values have been correlated to the registry data of all the users and stored in advance in the registry data storage 211 as described above. FIG. 6A shows the concept of calculating the verification acceptance values, which will be discussed later in detail.

Figure 6B:
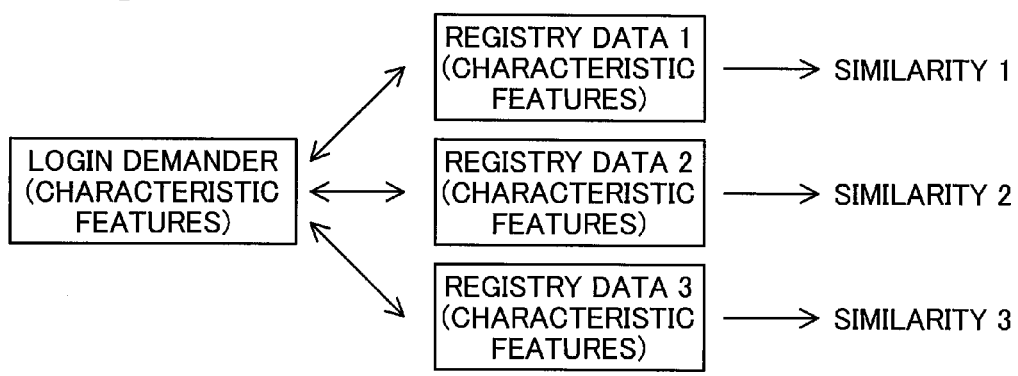

After calculation of the verification acceptance values, the CPU 203 calculates the similarity of vein information from the characteristic features of the respective registry data and the characteristic features extracted from the vein information of the login demander obtained in the current cycle of the authentication process (hereafter referred to as "authentication-subject vein information") (step S210). FIG. 6B shows the concept of calculating the similarity of vein information. The similarity of vein information is calculated from all the registry data stored in the registry data storage 211 and the authentication-subject vein information of the login demander obtained in the current cycle of the authentication process. More specifically, the similarity is given as a ratio (100×S/T) of the number of matching characteristic features (S) out of the characteristic features extracted in the authentication process, which match the characteristic features extracted in the registration process, to the total number of characteristic features (T) or the characteristic amount extracted in the registration process. In this embodiment, the similarity is shown by percentage. The similarity is calculated for each of the registry data stored in the registry data storage 211. For example, when three registry data are stored in the registry data storage 211, three similarities are calculated from the three registry data and the authentication-subject vein information of the login demander obtained in the authentication process.

Figure 6C:
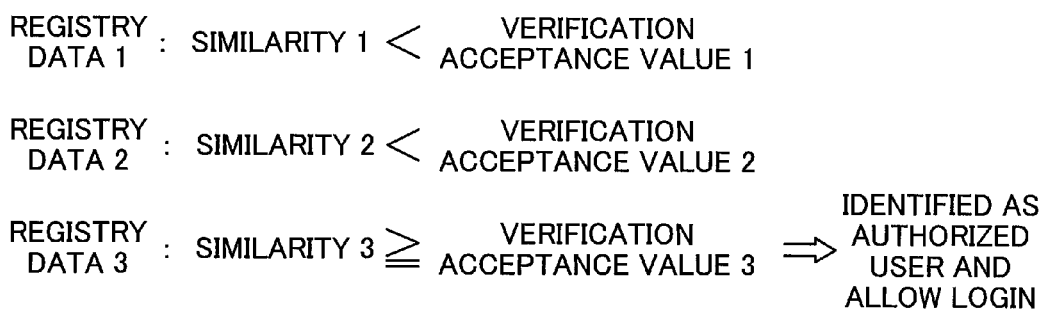

After calculation of the similarities for the respective registry data, the CPU 203 compares the calculated similarity of each registry data with the calculated verification acceptance value for the same registry data (step S212) as shown in FIG. 6C. When there is any registry data having the calculated similarity equal to or greater than the calculated verification acceptance value (step S212: Yes), the CPU 203 identifies the login demander as the authorized user corresponding to the registry data and allows a login of the login demander to the computer 100 (step S214). When there are a plurality of registry data having the calculated similarity equal to or greater than the calculated verification acceptance value, the CPU 203 identifies the login demander as the authorized user corresponding to the registry data having the highest similarity to allow a login. When there is no registry data having the calculated similarity equal to or greater than the calculated verification acceptance value (step S212: No), the CPU 203 identifies the login demander as unauthorized and rejects the login request of the login demander to the computer 100 (step S216). The CPU 203 then terminates this series of authentication process.

(A5) Verification Acceptance Value

Figure 7:
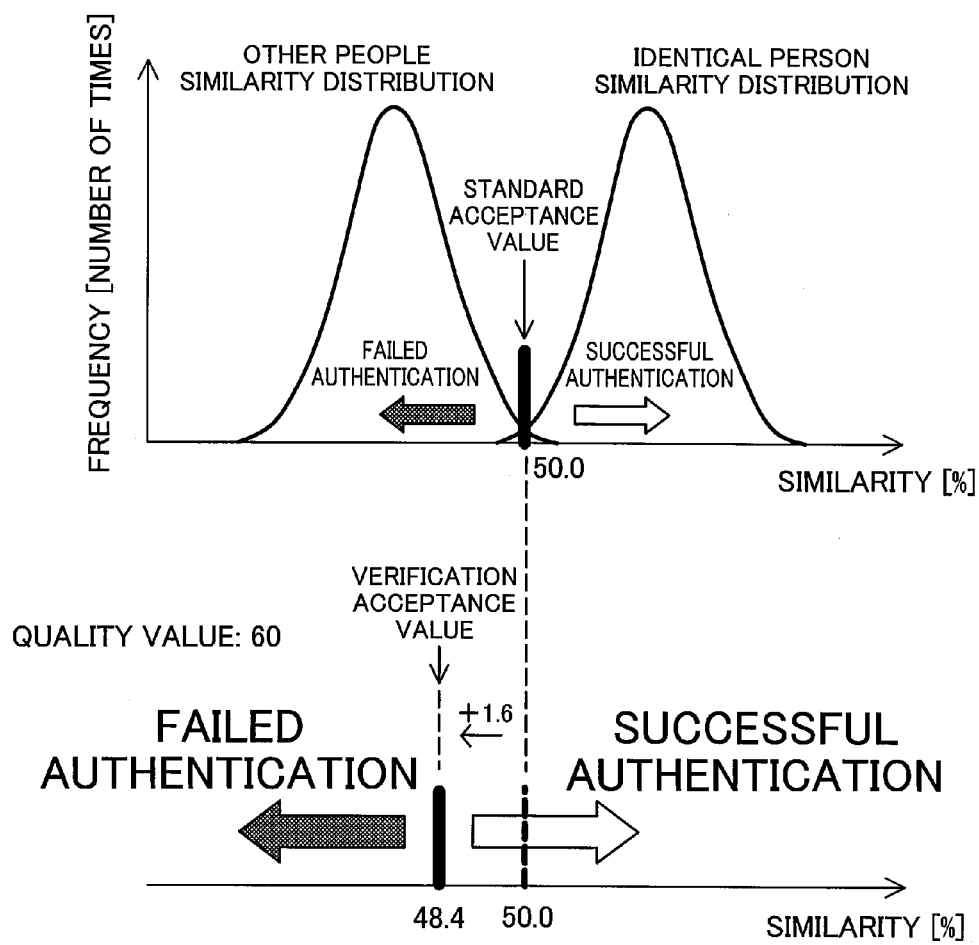
FIG. 7 is an explanatory diagram of a verification acceptance value.

The verification acceptance value calculated by the CPU 203 at step S208 in the authentication process of FIG. 5 is described with reference to FIG. 7. FIG. 7 shows the procedure of calculating the verification acceptance value. The verification acceptance value is calculated from a preset standard acceptance value as the criterion in the authentication process. The standard acceptance value is set according to an identical person similarity distribution and an other people similarly distribution (hereafter these two distributions are collectively referred to as "similarity distributions"). The identical person similarity distribution shows the distribution of similarity when a registrant registering registry data of the average quality performs authentication a plurality of times via the registry certification terminal 200. The registry certification terminal 200 prepares this identical person similarity distribution, based on the registry data of the registrant.

The other people similarity distribution shows the distribution of similarity, which is prepared based on the registry data of the registrant by the registry certification terminal 200 when a plurality of people other than the person registering the registry data performs authentication a plurality of times via the registry certification terminal 200. In this embodiment, the similarity at an intersection of these two similarity distributions is set to the standard acceptance value. The similarity distributions are generally known in the art. One application may prepare such similarity distributions in advance and determine the standard acceptance value based on the similarity distributions by taking into account the intended security level of the computer 100 adopting the biometric authentication system 10. The standard acceptance value may be a higher value than the similarity at the intersection of the two similarity distributions or may be a lower value than the similarity at the intersection. In application of setting a higher value than the similarity at the intersection of the two similarity distributions to the standard acceptance value and using this standard acceptance value in the authentication process, there is a higher possibility that even a login request of the registrant as a login demander is rejected as the similarity is less than the standard acceptance value. There is, however, a lower possibility that a login request of any login demander other than the registrant is accepted. In application of setting a lower value than the similarity at the intersection of the two similarity distributions to the standard acceptance value and using this standard acceptance value in the authentication process, there is a higher possibility that a login request of any login demander other than the registrant is accepted. There is, however, a lower possibility that a login request of the registrant as a login demander is rejected.

The verification acceptance value is calculated from the standard acceptance value determined as discussed above and the quality value calculated in the registration process. In other words, the verification acceptance value includes reflection of the quality of registry data to the standard acceptance value. The calculation of the verification acceptance value is described more specifically using a concrete example. In this example, registry data D1 has a quality value of "66" and the standard acceptance value is 50, i.e., the similarity is 50% at the intersection of the identical person similarity distribution and the other people similarity distribution. As explained above, the mean quality value is "50". There is a difference of "+16" between the quality value "66" of the registry data D1 and the mean quality value "50" (hereafter referred to as "quality difference value") (66−50=+16). This quality difference value of "+16" is reflected on the standard acceptance value at a preset rate. In this embodiment, the rate to be reflected on the standard acceptance value is set equal to 10% (=0.1) of the quality difference value. The rate of the quality difference value to be reflected on the standard acceptance value is hereafter referred to as "quality value reflection rate". In this embodiment, in the case of a high quality value, the verification acceptance value is to be set lower than the standard acceptance value. In the case of a low quality value, on the other hand, the verification acceptance value is to be set higher than the standard acceptance value. The verification acceptance value is thus calculated according to Equation (1) given below:

$$\text{Verification Acceptance Value} = (\text{Standard Acceptance Value}) - (\text{Quality Difference Value}) \times (\text{Quality Value Reflection Rate}) \quad (1)$$

In the above example, the verification acceptance value is calculated as "48.4" from the standard acceptance value of 50, the quality difference value of +16, and the quality value reflection rate of 0.1. The quality value reflection rate set equal to 10% (=0.1) in this embodiment may be changed by taking into account the intended security level of the computer 100 adopting the biometric authentication system 10. In another application, the verification acceptance value may be set stepwise according to the quality value without the above calculation. For example, a verification acceptance value is set equal to "54" for a quality value range of 0 to 10, to "53" for a quality value range of 10 to 20, and to "52" for a quality value range of 20 to 30.

As for vein information of a high quality value having characteristic features that have low probability of wrong authentication of other people, the verification acceptance value may be determined to increase the possibility of successful authentication of the identical person. This lowers the probability of wrong rejection of the identical person. As for vein information of a low quality value having characteristic features that have high probability of wrong authentication of other people, the verification acceptance value may be determined to decrease the possibility of wrong authentication of other people. This lowers the probability of wrong authentication of other people. This arrangement preferable enhances the overall authentication accuracy of the biometric authentication system 10.

Figure 8:
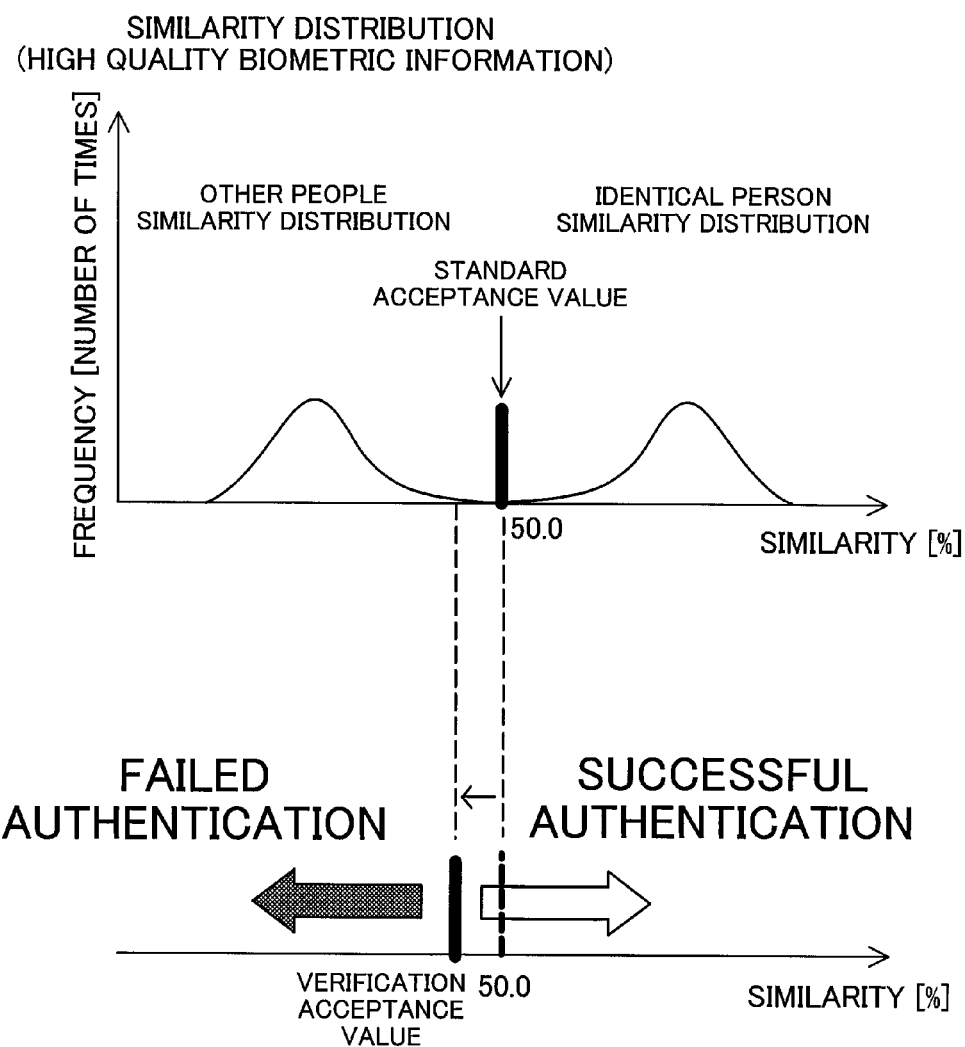
FIG. 8 is an explanatory diagram of the advantageous effect of the invention.

This advantageous effect of the present invention is explained more specifically. FIG. 8 shows an identical person similarity distribution and an other people similarity distribution prepared for registry data of a high quality value. In this case, the mean values of the two similarity distributions are apart from each other across the standard reference value based on the registry data of the average quality. The high-quality registry data has a large amount of characteristic features and high uniqueness. There is accordingly a low probability that the high-quality registry data is similar to the biometric information of any other person, while there is a high probability that the high-quality registry data is similar to the biometric information of the identical person. As shown in FIG. 8, as for the registry data of the high quality value, even lowering the verification acceptance value prevents an increase in potential risk of wrong authentication of other people. The procedure of this embodiment lowers the verification acceptance value for the registry data of the high quality value as discussed above, based on this ground shown in the concrete example of FIG. 8. Lowering the verification acceptance value for the high-quality registry data lowers the probability of wrong rejection of the identical person, while preventing an increase in potential risk of wrong authentication of other people.

FIG. 9 shows an identical person similarity distribution and an other people similarity distribution prepared for registry data of a low quality value. In this case, the mean values of the two similarity distributions are close to each other across the standard reference value based on the registry data of the average quality and have some overlap. As for the registry data of the low quality value, it is required to reduce the potential risk of wrong authentication of other people by raising the verification acceptance value. The procedure of this embodiment raises the verification acceptance value for the registry data of the low quality value as discussed above, based on this ground shown in the concrete example of FIG. 9. Raising the verification acceptance value for the low-quality registry data reduces the potential risk of wrong authentication of other people. These effects preferably enhance the authentication accuracy.

The procedure of this embodiment calculates a verification acceptance value in each cycle of the authentication process. The procedure of another application may calculate a verification acceptance value from the quality value of the vein information of a registrant and store the calculated verification acceptance value, prior to the authentication process. Calculating a verification acceptance value in each cycle of the authentication process of the embodiment enables the rate of reflection of the quality value on the standard acceptance value to be occasionally varied by taking into account the intended security level of a login system adopting the biometric authentication system 10 (for example, a login to a computer owned and used by an individual or a login to a computer owned by a company or business organization requiring high security). In the application of advanced calculation and storage of the verification acceptance value, recalculation of the verification acceptance value based on the registered vein information is required every time the security level is changed. The procedure of calculating a verification acceptance value from the quality value of the vein information of a registrant and the quality value reflection rate in the authentication process of the embodiment has the general versatility.

The authentication process of the embodiment calculates the verification acceptance value from the characteristic data extracted from the vein information of a registrant and the quality value and uses the calculated verification acceptance value for authentication. The verification acceptance value is not changed with an increase in total number of registry data or even in the case of transfer of registry data to another database, i.e., with a change of the population of registry data.

The registry data of the embodiment corresponds to the registry information. The series of processing performed by the CPU 203 according to the quality evaluation program 209 in the embodiment corresponds to the acceptance value determiner. The step of reading biometric information (step S202 in FIG. 5) by the CPU 203 in the authentication process of the embodiment corresponds to the authentication information acquirer. The step of calculating similarity (step S210 in FIG. 5) by the CPU 203 in the authentication process of the embodiment corresponds to the similarity calculator. The authentication program 208 of the embodiment corresponds to the authenticator.

B. Modifications

The invention is not limited to the embodiment and its applications discussed above but may be actualized in diversity of other embodiments and applications within the scope of the invention. Some examples of possible modification are given below.

(B1) Modification 1

The above embodiment describes N:1 authentication with a plurality of registered users. The biometric authentication system 10 is similarly applicable to 1:1 authentication with only one registered user, i.e., authentication for a login to a device or apparatus generally designed for a single user, for example, a computer or a cell phone owned and used by one individual.

(B2) Modification 2

The above embodiment describes authentication for a login to the computer. The biometric authentication device of the invention is applicable to any of various systems requiring individual authentication, for example, an automatic lock system, an identification system for payment with a credit card, an automated teller machine or ATM.

(B3) Modification 3

The procedure of the embodiment calculates the verification acceptance value from the standard acceptance value, the quality value, and the quality value reflection rate. The calculation of the verification acceptance value is, however, not restricted to this method. Alternatively the verification acceptance value may be calculated from only the quality value. When the quality value is "65", the verification acceptance value may be calculated by simply subtracting the quality value "65" from the maximum similarity "100". This modification application still has the relation of the lower verification acceptance value to the higher quality value and accordingly assures the similar effects to those of the above embodiment.

(B4) Modification 4

The procedure of the embodiment calculates the verification acceptance value in the authentication process. Alternatively the verification acceptance value may be calculated in the registration process. This modified application reduces the total processing time of the authentication process by elimination of the calculation of the verification acceptance value.

(B5) Modification 5

The procedure of the embodiment uses the finger veins as the biometric information. The biometric information used for authentication is, however, not restricted to the finger veins but may be any of other suitable pieces of information relating to the physical characteristics or the behavioral characteristics of each individual, for example, fingerprint, iris, face, signature, or voiceprint.

The biometric authentication system 10 of the embodiment performs the registration process for registry of the biometric information of a registered user. One modified application may obtain the biometric information of a user as registry data by another suitable means and transfer the obtained registry data to the biometric authentication system 10. The biometric authentication system 10 then calculates the quality value and the verification acceptance value to perform authentication. In this modified application, the biometric authentication system 10 does not perform registration but performs only authentication. This modified application has the similar effects to those of the above embodiment.

(B6) Modification 6

The procedure of the embodiment lowers the verification acceptance value for registry data of the high quality value, while raising the verification acceptance value for registry data of the low quality value. This arrangement is, however, neither essential nor restrictive. One modified procedure may lower the verification acceptance value for registry data of the high quality value, while using the standard acceptance value in place of the verification acceptance value for registry data of the low quality value. Another modified procedure may raise the verification acceptance value for registry data of the low quality value, while using the standard acceptance value in place of the verification acceptance value for registry data of the high quality value. These modified arrangements also preferably reduce the potential risk of wrong authentication of other people and lower the probability of wrong rejection of the identical person.

The embodiment and its modifications are described for the better understanding of the invention and are to be considered in all aspects as illustrative and not restrictive. There may be many modifications, changes, and alterations without departing from the scope or spirit of the main characteristics of the present invention. All such modifications and changes that come within the meaning and range of equivalency of the claims are to be embraced within their scope.

What is claimed is:

1. A biometric authentication device of performing authentication of a user based on biometric information, comprising:
   a registry information storage configured to store pre-registered biometric information as registry information; and
   one or more computers comprising:
   an acceptance value determiner configured to determine a verification acceptance value used for authentication, based on a quality value of the registry information with regard to reliability of characterizing an individual;
   an authentication information acquirer configured to obtain the biometric information of the user as authentication information;
   a similarity calculator configured to compare the authentication information of the user with the registry information and calculate similarity between the authentication information and the registry information; and
   an authenticator configured to identify whether the user is a registrant corresponding to the registry information, based on the similarity and the verification acceptance value,
   wherein the acceptance value determiner is configured to determine the verification acceptance value, which is a difference between standard acceptance value which is set as a criterion for the authentication, and a quality difference value which is a difference between a mean quality value and the quality value of the registry information of a target of the authentication.

2. The biometric authentication device in accordance with claim 1, wherein the acceptance value determiner is configured to determine the verification acceptance value in an authentication process.

3. The biometric authentication device in accordance with claim 1, wherein:
the registry information storage stores biometric information of a plurality of the registrants as registry information,
the acceptance value determiner is configured to determine the verification acceptance value in correlation to each of the registry information corresponding to each of the plurality of the registrants, based on the quality value of the each of the registry information,
the similarity calculator is configured to compare the authentication information of the user with each of the registry information and calculate similarity between the authentication information and the each of the registry information, and
the authenticator is configured to identify whether the user is one of the plurality of the registrants, based on the verification acceptance value and the similarity in correlation to each of the registry information.

4. The biometric authentication device in accordance with claim 1, further comprising:
a registry information acquirer configured to obtain the biometric information as the registry information and store the obtained biometric information into the registry information storage.

5. The biometric authentication device in accordance with claim 1, wherein the acceptance value determiner is configured to determine the verification acceptance value to increase probability of successful authentication of the user as the registrant corresponding to the registry information by the authenticator, with an increase in the quality value of the registry information.

6. The biometric authentication device in accordance with claim 1, wherein the standard acceptance value is based on a security level for authentication.

7. The biometric authentication device in accordance with claim 1, wherein the biometric information is information of finger vein.

* * * * *